March 24, 1936.     E. H. SMITH     2,035,202

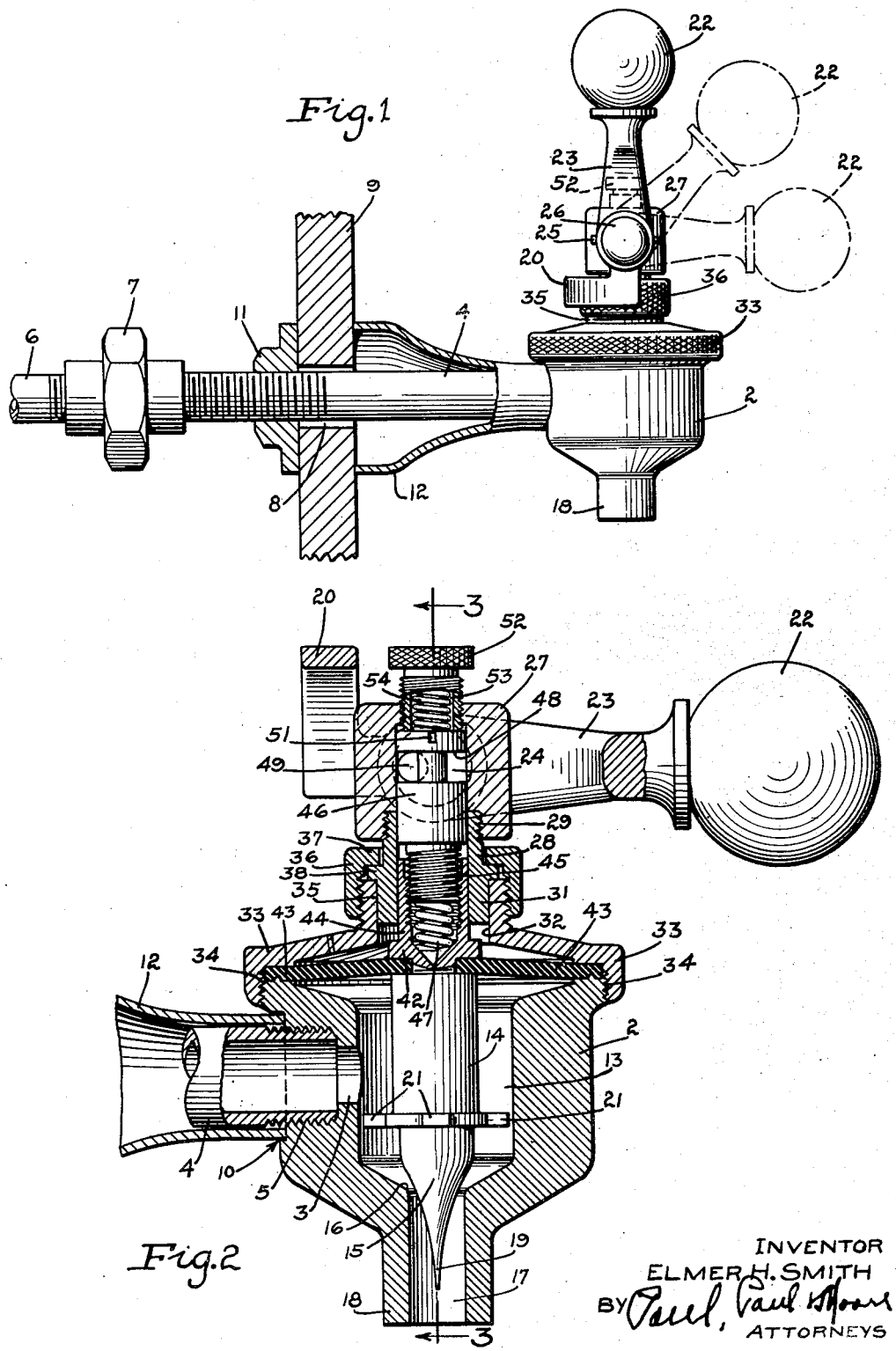

BEVERAGE DISPENSING FAUCET

Filed July 12, 1934     2 Sheets-Sheet 2

INVENTOR
ELMER H. SMITH
BY *Paul, Paul Moore*
ATTORNEYS

Patented Mar. 24, 1936

2,035,202

UNITED STATES PATENT OFFICE 2,035,202

BEVERAGE DISPENSING FAUCET

Elmer H. Smith, Minneapolis, Minn., assignor to Smith Welding Equipment Corporation, Minneapolis, Minn., a corporation of Delaware Application July 12, 1934, Serial No. 734,790

7 Claims. (Cl. 225—5)

This invention relates to new and useful improvements in faucets, and more particularly to a faucet for dispensing effervescent or gaseous beverages, such as beer.

An object of the invention is to provide a beer faucet having an annular seat adapted to be engaged by a tapered or conical valve plug having means for lifting it off said seat in an axial direction, and the valve plug being so designed as to cause the liquid to flow downwardly over the surface thereof in a thin film, when the valve is only slightly opened, whereby it may trickle from the nozzle of the valve in a thin, non-turbulent stream, to thereby reduce the foaming action of the liquid when it is discharged into a glass or receptacle, said valve also being so designed that the beer may be discharged therefrom in a relatively larger, high velocity jet or stream, and also whereby a full, smooth-flowing stream may be obtained, the above results being made possible as a result of the novel design of the valve and by varying the opening or gap between the valve plug and its annular seat.

A further object of the invention is to provide a beer faucet having an annular valve seat and a valve plug engaging said seat, and having a relatively long needle-like point projecting into the discharge opening of the valve body, and over the surface of which the beer flows in a thin film, when the valve is "cracked", or only slightly opened, whereby the velocity of the liquid is greatly reduced to thereby reduce to a minimum, the turbulent action of the beer when it may be discharged into a glass from the nozzle of the valve in a relatively small non-turbulent stream, which may be enlarged by gradually opening the valve until a full sized, smooth-flowing stream is obtained.

A further object is to provide a faucet for dispensing beverages comprising a body having an annular valve seat therein surrounding a dispensing opening, and also having a plug valve movably supported in said body and adapted to engage said seat, and means being provided above said body for actuating the valve and whereby its operation may be accurately controlled, and means being interposed between said plug valve and said operating mechanism for positively preventing the liquid from contacting with the operating mechanism, and whereby the valve is rendered leak-proof.

Other objects reside in the means provided for positively limiting the movement of the valve, whereby it may be adjusted for dispensing beverages having varying gas contents, and whereby when used for dispensing a highly effervescent or gaseous beverage, such as "wild" beer, the valve may be so positioned as to cause the beer to trickle from the nozzle of the valve in a non-turbulent, pencil-like stream, which may be discharged into a glass with a minimum amount of foam; in the means provided for relatively adjusting the valve with respect to its seat, to take up wear in the valve seat and operating mechanism, and whereby the valve may always be maintained leak-proof; and in the simple and inexpensive construction of the valve, whereby it may readily be taken apart for cleaning or repairs, when necessary.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a side elevation of my improved valve, showing in full and dotted lines, various positions of the operating handle;

Figure 2 is an enlarged vertical sectional view on the line 2—2 of Figure 3, showing the valve wide open;

Figure 5:
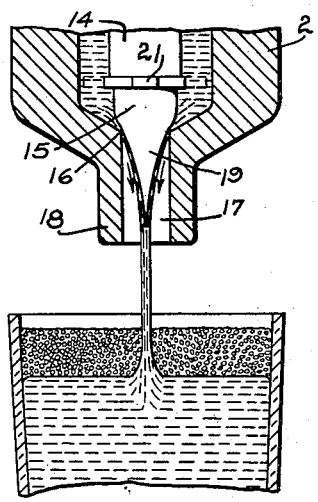
Figure 5 is a view showing the valve only slightly open, whereby the beverage is discharged therefrom in a relatively small, needlelike stream.

The novel beverage dispensing faucet herein disclosed, is shown comprising a body 2, preferably cylindrical in cross-section, and having an intake opening 3 at one side thereof, to which a suitable supply pipe 4 may be connected by suitable threads 5. The pipe 4 may be connected to a supply line 6 by a suitable union 7, as is well-known.

In Figure 1, the pipe 4 is shown received in an aperture 8 provided in a wall 9, which may be a portion of a counter or dispensing apparatus, and it is secured thereto by a jam nut 11 received in threaded engagement with the pipe 4 and whereby the wall 9 may be clamped securely between a fitting 12 and the jam nut 11. The fitting 12 has one end engaging the valve body, as shown at 10 in Figure 2.

An important feature of the invention resides in the means provided for controlling the discharging of the beverage or liquid from the chamber 13 of the valve body, whereby the foaming action of the beverage may readily be controlled, so that when the beverage is precipitated into a glass, it will have a desirable amount of foam, or the proper size "head", as it is commonly referred to in the trade.

Figure 3:
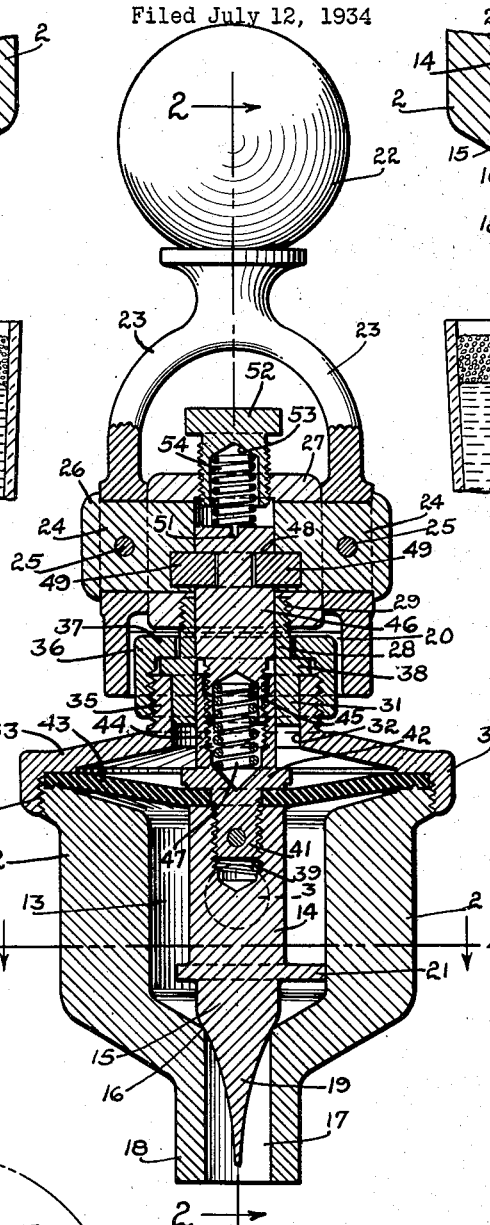
Figure 3 is a vertical sectional view on the line 3—3 of Figure 2, showing the position of the parts when the valve is closed.
Figure 6:
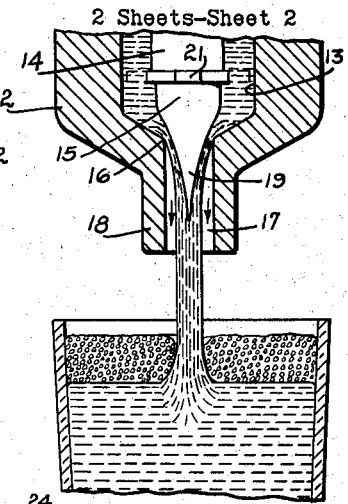
Figure 6 is a view showing the valve opened to permit a relatively larger, high velocity stream to discharge therefrom.
Figure 4:
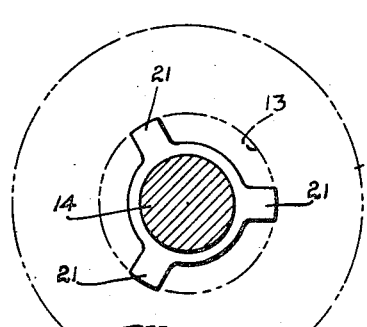
Figure 4 is a detail sectional plan view on the line 4—4 of Figure 3, with some of the parts omitted.

Such means consists of a plug valve 14 mounted for axial movement within the valve chamber 13, and having a long, tapered or cone-shaped end portion 15, the enlarged portion of which engages an annular valve seat 16 provided at the juncture between the valve chamber 13 and the dispensing opening 17 of the valve body, which opening is defined by a cylindrical wall 18, as clearly illustrated in Figures 2 and 3.

The plug valve 14 is shown having its lower end tapering downwardly to provide a needle-like point 19, which projects into the discharge opening or nozzle 17 of the valve, as clearly illustrated in the drawings. Outwardly projecting lugs 21 are provided on the lower portion of the valve body adapted to engage the walls of the valve chamber 13, to thereby guide the valve in its axial movement, when opened or closed.

The means for operating the plug valve 14 is shown comprising a handle 22 having spaced legs 23 in which suitable trunnions 24 are secured, by such means as pins 25. The trunnions 24 are shown provided with heads 26 fitting against the outer faces of the legs 23, and have their inner ends rotatably mounted in bearings provided in a head 27 having one end of a sleeve, generally indicated by the numeral 28, fixedly secured to the lower end thereof by suitable threads 29. The sleeve 28 has a cylindrical portion 31 removably fitting into a bore 32, provided in a cap 33. This cap is removably secured to the valve body 2 by suitable threads 34.

The wall of the bore 32 constitutes an upstanding neck 35 exteriorly threaded to receive a coupling member 36, having an inwardly extending flange 37 engaging an outwardly extending flange 38 provided upon the sleeve 28 and whereby, when the clamping member 36 is screwed into engagement with the threaded neck 35, the head 27 is rigidly secured to the cap 33 of the valve body.

The plug valve 14 is shown provided at its upper end with a threaded socket 39 adapted to receive the lower threaded end portion 41 of a nut 42, between which and the upper end of the plug valve 14, a diaphragm 43 is clamped in leak-proof relation. The marginal edge of the diaphragm 43 is clamped between the upper face of the valve body 2 and the cap 33 of said body, and functions to positively prevent the liquid or beverage in the valve chamber 13 from leaking into the upper portion of the valve and into contact with the operating mechanism thereof.

The nut 42 has an upstanding cylindrical portion 44 slidably received in the bore of the sleeve 28, and has a threaded socket therein adapted to receive the lower threaded end portion 45 of an adjusting stud 46, which cooperates with the cylindrical portion 44 of the nut 42 to provide a guide for the plug valve 14.

The threaded extension 45 of the stud 46 is shown provided with a socket adapted to receive one end of a suitable compression spring 47, the opposite end of which is seated in the bottom of the socket provided in the nut 42. The spring 47 merely functions as a locking means for retaining the stud 46 in adjusted position with respect to the cylindrical portion 44 of the nut 42. In other words, it constantly tends to force apart the elements 42 and 46, and thereby creates considerable friction in the threads connecting together these elements, whereby the stud 46 is prevented from relatively rotating when the valve is in use. The nut 42 and stud 46 cooperate to provide a stem for the plug valve 14, which stem is guidingly supported in the bore of the sleeve 28.

The upper portion 46 of the valve stem has an annular groove 48 adapted to receive a pair of oppositely disposed crank pins 49, secured in the trunnions 24, as clearly illustrated in Figures 2 and 3. Thus, when the trunnions 24 are rotated by manipulation of the handle 22, the valve stem is axially moved in its guide to thereby actuate the plug valve 14. The upper end portion of the valve stem is shown provided with a slot 51 adapted to receive a suitable instrument, such as a screw driver, whereby the upper portion 46 of the valve stem may be relatively rotated with respect to the lower portion 44 thereof, to thereby relatively adjust the position of the valve with respect to the annular seat 16.

Another important feature of the invention resides in the means provided for positively limiting the unseating movement of the plug valve 14, when the handle 22 is actuated. Such means is best shown in Figures 2 and 3, and comprises a knurled screw 52 received in threaded engagement with the upper end of the head 27 and having a socket 53 receiving one end of a suitable compression spring 54, the opposite end of which is seated against the upper end of the stud 46 of the valve stem, as clearly illustrated in Figure 3. The lower end of the adjusting screw 52 is adapted to be engaged by the upper end of the valve stem, when the operating handle 22 is moved downwardly, as shown in Figure 2, in which figure the screw 52 is positioned to permit maximum opening of the valve. To reduce the size of the valve opening, the screw 52 is adjusted to reduce the width of the gap between the lower end of said screw and the upper end of the valve stem, whereby the upward movement of the valve stem is shortened, with the result that the valve opening is correspondingly decreased.

In the operation of this novel valve, the handle 22, which normally is positioned as shown in full lines in Figure 1, is moved downwardly, whereby the crank pins 49 will lift the valve from its seat and thus permit the liquid under pressure in the chamber 13, to discharge from the valve through the nozzle 17, it being understood that the chamber 13, being in direct communication with the supply pipe 4, is constantly being supplied with the beverage. The position of the adjusting screw 52, in addition to limiting the upward or opening movement of the valve 14, also limits the swinging movement of the handle 22, as indicated by the dotted lines in Figure 1.

It is well-known that when dispensing a beverage such, for example, as beer, that the first beer drawn or dispensed from the barrel will be comparatively "wild", resulting usually because of the agitated condition of the beer, and also because of the beer containing a maximum amount of $CO_2$ gas. When such wild beer is discharged into a glass, an excessive amount of foam is usually produced in the glass, which is objectionable, and this objectionable feature may be entirely eliminated by the use of the novel faucet herein disclosed.

When using the faucet herein shown for dispensing wild beer, the adjusting screw 52 is manipulated so as to reduce the valve opening to a very small annular orifice, whereby the beer will trickle into the glass in a small needle-like stream which will not agitate the beverage, so that when the glass is filled, the beer will not contain an excessive amount of foam. Thus, when dispensing wild beer, the operator so adjusts the screw 52 that when the handle 22 is pulled forwardly to unseat the valve, the tapered portion 15 of the valve plug will merely move out of engagement with the seat 16, whereby the beverage will discharge through an annular orifice of comparatively small area, cross-sectionally, and will flow in a thin film downwardly over the surface of the needle point 19 of the valve, from whence it will trickle into the glass in a small needle-like stream, as illustrated in Figure 5. The turbulence set up in the glass by this small stream is not sufficient to agitate the beverage to the extent that an excessive amount of foam is produced.

When a portion of the beer has been tapped from the barrel, and the beverage has lost some of its wildness, the adjusting screw 52 is manipulated to provide a relatively large dispensing opening, when the operating handle 22 is swung forwardly, as indicated by the dotted lines in Figure 1, until finally the adjusting screw 52 may be so positioned as to permit full opening of the valve, as shown in Figure 2, whereby a full sized, smooth flowing, non-turbulent stream is provided, which may be projected into a glass without producing an excessive amount of foam.

It is well-known to those familiar with dispensing the draft beer, that oftentimes, the last gallon or two drawn from the barrel before the latter is completely emptied, is found more or less "flat", usually as a result of a portion of the gas content of the beer having been dissipated. I have found that by manipulating the adjusting screw 52, the valve may be so adjusted that beer which has thus become more or less flat, may be dispensed from the valve into a glass in such a manner as to have the desired amount of foam thereon, or, in other words, the desired size head. This is accomplished by so adjusting the dispensing opening that when the handle 22 is operated, a high velocity, solid stream or jet is projected from the nozzle of the valve into the glass, with sufficient force to agitate the beer therein, whereby a suitable head is provided on the beer. This feature, therefore, is important, because it results in economy in that all of the beer in the barrel may be dispensed, it being well known that beer which appears flat, when poured into a glass, is not desirable.

The construction and operation of the valve are very simple. To adjust the plug valve with respect to the seat 16, the adjusting screw 52 is removed from its socket, whereby a screw driver may be inserted through the opening in the upper end of the head 27, into engagement with the slot 51 provided in the upper end of the valve stem. In the drawings, I have shown the threaded connections between the upper part 46 of the valve stem and the lower portion 44 thereof, as constituting a right hand thread, whereby when the upper portion or stud 46 of the valve stem, is rotated in a clockwise direction, when viewed as shown in Figure 2, the distance between the annular groove 48 in the valve stem and the cone-shaped portion 15 of the valve is relatively shortened. Conversely, when the portion 46 of the valve stem is rotated in a counter-clockwise direction, the overall length of the valve stem is lengthened.

The crank pins 49 are so arranged with respect to the operating handle 22 and the valve 14, that when the handle is in its vertical position, as shown in full lines in Figures 1 and 3, the crank pins 49 will be on "dead center" and will thus firmly secure the valve to its seat. Thus, by relatively adjusting the upper portion 46 of the valve stem, the valve may readily be properly adjusted with respect to its seat 16, whereby the valve is rendered positively leak-proof at this point.

The diaphragm 43 provides a flexible seal between the valve chamber 13 and the operating mechanism of the valve, and positively prevents the beverage from leaking from the chamber 13 into the upper portion of the valve structure. Thus, by the provision of the diaphragm, no packing nuts or glands are necessary, and suitable clearance may be provided between the operating parts of the valve to permit free operation thereof without danger of leakage. As hereinbefore stated, when the operating handle 22 is in its closed position, as shown in full lines in Figure 1, the crank pins 49 are on dead center whereby the valve cannot be opened by the pressure of the liquid in the chamber 13. When the operating lever 22 is moved forwardly, however, the pressure of the beverage in the valve chamber 13 acts on the diaphragm 43 and will tend to open the valve to maximum opening, limited by the position of the adjusting screw 52.

When it is found necessary to clean the valve chamber 13, the supply of beverage to the valve is cut off by suitable means, not shown, after which the cap 33 may be unscrewed from the valve body. When the cap is removed, the plug valve 14 is simultaneously removed therewith, and the operating mechanism of the valve is also removed therewith as a unit, thereby providing free access to the valve chamber and valve, whereby these parts may readily and quickly be cleaned. When the cap 33 is subsequently secured to the valve body in its normal position, as shown in Figures 2 and 3, should the operating handle 22 not be properly alined with the dispensing apparatus or, in other words, be alined with the supply pipe 4, when the handle is in the position shown in Figure 2, then by slightly loosening the clamping nut 36, the upper portion of the valve including the handle 22 may be rotated about the axis of the valve stem until properly alined with the apparatus, after which the nut 36 is tightened.

From the foregoing, it will therefore be seen that the novel dispensing faucet herein disclosed may readily be used for dispensing beer, regardless of whether it is in a comparatively wild or highly gaseous state, in a normal state, or in a flat or lifeless state. This is made possible by the unique construction of the valve and its operating mechanism, whereby the annular orifice or opening through which the beer passes from the valve chamber 13 to the nozzle 17, may be so regulated as to positively control the velocity of the stream or jet projected into the glass, whereby the proper head of foam may be obtained upon the beer.

I claim as my invention:

1. A beverage dispensing faucet comprising a body having a chamber therein provided at its bottom with a discharge opening, means for supplying a beverage to said chamber under pressure, a valve for controlling liquid flow through said discharge opening, means embodied in the construction of said valve, whereby the liquid may be discharged from said opening in the form of a small, low velocity stream, or in the form of a relatively larger, high velocity jet, eccentric means for operating the valve, and a flexible element providing a leak-proof partition between said mechanism and said chamber.

2. A beer dispensing faucet comprising a body having a chamber therein provided at its bottom with a valve opening, a diaphragm defining the upper wall of said chamber, means for delivering beer to said chamber, a valve in said chamber for controlling liquid flow through said valve opening, eccentric means above the diaphragm for actuating said valve, and means whereby the movement of the valve may be limited to permit only a predetermined flow through said valve opening, when the valve is opened.

3. A beer dispensing faucet comprising a body having a chamber therein provided at its bottom with a valve opening, a diaphragm defining the upper wall of the chamber, means for delivering beer to said chamber under pressure, a valve in said chamber having a portion extending into said valve opening, said valve having a guide stem secured to its upper end, and between which and the valve body the diaphragm is clamped in leak-proof relation, an operating mechanism for the valve located above the diaphragm and comprising a crank pin engaging a groove in the valve stem, and an adjustable stop positioned to be engaged by the valve stem to thereby limit the opening movement of the valve.

4. A beer dispensing faucet comprising a body having a chamber therein provided with a discharge opening of large diameter, a valve seat surrounding said opening, means for delivering beer to said chamber under pressure, a valve plug movable in the chamber and adapted to engage said seat to thereby control liquid flow through the discharge opening, said valve plug having a comparatively long needle-like portion projecting into said discharge opening and functioning to direct the liquid from the chamber into a receptacle, in a small non-turbulent stream, whereby the beverage is prevented from excessively foaming, and an operating mechanism for the valve comprising oppositely disposed crank pins.

5. A beer dispensing faucet comprising a body having a chamber therein provided at its bottom with a dispensing opening of large diameter, a valve seat surrounding said opening, means for supplying beer to said chamber under pressure, a valve movable in said chamber and adapted to engage said seat to thereby control liquid flow through said dispensing opening, said valve comprising a long, slender terminal extending into said dispensing opening, and over the surface of which the beer will flow in a thin, non-turbulent film, and whereby it may be discharged from said dispensing opening into a glass without an excessive amount of foam, said valve having a guide stem provided with an annular groove, and an operating mechanism for the valve stem comprising oppositely disposed trunnions having crank pins received in said grooves.

6. A beer dispensing faucet comprising a body portion having a chamber therein provided at its bottom with a dispensing opening surrounded by an annular seat, a plug valve movable in said chamber and adapted to engage said seat, said plug valve having a portion extending into said dispensing opening, a diaphragm defining the upper wall of said chamber and to which the upper end of the plug valve is secured, a stem member received in threaded engagement with the upper end of the plug valve, and between which and the valve the diaphragm is clamped in leakproof relation, means for guiding said stem member, an operating handle operatively connected to said stem member whereby when the handle is oscillated in one direction, the valve is unseated, and means for limiting longitudinal movement of said valve, whereby the degree of opening thereof may be varied.

7. A beer dispensing faucet comprising a body having a chamber therein provided with a dispensing opening surrounded by an annular valve seat, a plug valve mounted for axial movement in said chamber and adapted to engage said seat to control liquid flow through the dispensing opening, a diaphragm defining the upper wall of said chamber and to which the upper end of the valve stem is secured in leak-proof relation, a threaded socket in the upper end of the valve, a member received in threaded engagement with said socket and having means adapted to be engaged by an operating handle, whereby the valve may be unseated, and the threaded connection between said member and said plug valve providing means whereby the overall length of the valve, as a whole, may be relatively shortened or lengthened, to thereby cause the valve to properly engage said seat when in closed position.

ELMER H. SMITH.